US008365224B2

(12) United States Patent
Yoon et al.

(10) Patent No.: US 8,365,224 B2
(45) Date of Patent: Jan. 29, 2013

(54) EXTENDED DESCRIPTION TO SUPPORT TARGETING SCHEME, AND TV ANYTIME SERVICE AND SYSTEM EMPLOYING THE SAME

(75) Inventors: Kyoung-Ro Yoon, Seoul (KR); Sun-Young Han, Seoul (KR); Hee-Kyung Lee, Daejeon (KR); Jae-Gon Kim, Daejeon (KR); Jin-Soo Choi, Daejeon (KR); Jin-Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 611 days.

(21) Appl. No.: 11/571,143

(22) PCT Filed: Dec. 17, 2004

(86) PCT No.: PCT/KR2004/003345

§ 371 (c)(1), (2), (4) Date: Apr. 25, 2008

(87) PCT Pub. No.: WO2006/001565

PCT Pub. Date: Jan. 5, 2006

(65) Prior Publication Data

US 2008/0271079 A1 Oct. 30, 2008

(30) Foreign Application Priority Data

Jun. 24, 2004 (KR) ........................ 10-2004-0047812

(51) Int. Cl.
*G06F 13/00* (2006.01)
*G06F 3/00* (2006.01)
*H04N 5/445* (2011.01)

(52) U.S. Cl. ........................................................ 725/46

(58) Field of Classification Search ..................... 725/46
See application file for complete search history.

(56) References Cited

U.S. PATENT DOCUMENTS 5,801,747 A 9/1998 Bedard
2002/0129371 A1* 9/2002 Emura et al. .................... 725/61
(Continued)

FOREIGN PATENT DOCUMENTS

CN 1374805 A 10/2002
JP 2004-015529 A 1/2004
(Continued)

OTHER PUBLICATIONS

"Call for Contributions for TV-Anytime Phase 2 Technologies," <http://www.tv-anytime.org/ftp/index.html>, >TVxxx: Official output documents by the TV-Anytime Forum, >Plenary/TV179r3.zip, Aug. 2003.

(Continued)

*Primary Examiner* — Pankaj Kumar
*Assistant Examiner* — Mulugeta Mengesha

(57) ABSTRACT

The present research relates to description supporting a targeting scheme, more particularly, to an extended description structure supporting a targeting scheme and a TV-Anytime service providing method and system employing the same based on Moving Picture Experts Group 21 (MPEG-21) Usage Environment Description (UED) tools. The TV-Anytime service providing system employing the extended description structure includes a service providing apparatus for generating package metadata including user information and usage environment information; and a user device for acquiring the package metadata including user information and usage environment information from the service providing apparatus through diverse access networks.

10 Claims, 8 Drawing Sheets

Generate package metadata based on extended description — S10
↓
Acquire package metadata — S20
↓
Analyze UED in package metadata — S30
↓
Select contents (resource, component) suitable for environment — S40

U.S. PATENT DOCUMENTS

| | | | |
|---|---|---|---|
| 2003/0097657 A1 | 5/2003 | Zhou et al. | |
| 2003/0121040 A1* | 6/2003 | Ferman et al. | 725/40 |
| 2003/0226151 A1* | 12/2003 | Hamada et al. | 725/132 |
| 2004/0203848 A1* | 10/2004 | Kumar | 455/456.1 |
| 2004/0220926 A1* | 11/2004 | Lamkin et al. | 707/3 |
| 2005/0076014 A1* | 4/2005 | Agarwal et al. | 707/3 |
| 2005/0120123 A1* | 6/2005 | Huang et al. | 709/231 |

FOREIGN PATENT DOCUMENTS

| | | | |
|---|---|---|---|
| JP | 2004-348565 | A | 12/2004 |
| KR | 1020030056312 | A | 7/2003 |
| KR | 1020030094163 | A | 12/2003 |
| KR | 1020040025098 | A | 3/2004 |
| WO | WO 01/02984 | A2 | 1/2001 |
| WO | WO 2004/008768 | A1 | 1/2004 |

OTHER PUBLICATIONS

"Package: Schema and Resolution WD942," <http://www.tv-anytime.org/ftp/index.html>, >WDxxx: Inernal working documents by the TV-Anytime Forum, >27_0403_San/WD942.zip, Mar. 2004.

Kyoungro Yoon et al., "Proposal of Descriptions to Support Targeting", TV Anytime Meeting, Jun. 2004, pp. 1-12.

* cited by examiner

FIG. 5

```
<complexType name="UserInfoType">
    <complexContent>
        <extension base="dia:UserCharacteristicBaseType">
            <sequence>
                <element name="UserInfo" type="mpeg7:AgentType" minOccurs="0"/>
            </sequence>
            <attribute name="allowAutomaticUpdate" type="mpeg7:userChoiceType" use="optional" default="false"/>
            <attribute name="protected" type="mpeg7:userChoiceType" use="optional" default="true"/>
        </extension>
    </complexContent>
</complexType>
```

FIG. 6

```
<complexType name="LocationType">
    <complexContent>
        <extension base="dia:NaturalEnvironmentCharacteristicBaseType">
            <sequence>
                <element name="Location" type="mpeg7:PlaceType"/>
            </sequence>
            <attribute name="allowAutomaticUpdate" type="mpeg7:userChoiceType" use="optional" default="false"/>
            <attribute name="protected" type="mpeg7:userChoiceType" use="optional" default="true"/>
        </extension>
    </complexContent>
</complexType>
```

FIG. 7

```
<complexType name="TimeType">
  <complexContent>
    <extension base="dia:NaturalEnvironmentCharacteristicBaseType">
      <sequence>
        <element name="Time" type="mpeg7:TimeType"/>
      </sequence>
      <attribute name="allowAutomaticUpdate" type="mpeg7:userChoiceType" use="optional" default="false"/>
      <attribute name="protected" type="mpeg7:userChoiceType" use="optional" default="true"/>
    </extension>
  </complexContent>
</complexType>
```

EXTENDED DESCRIPTION TO SUPPORT TARGETING SCHEME, AND TV ANYTIME SERVICE AND SYSTEM EMPLOYING THE SAME

TECHNICAL FIELD

The present invention relates to description to support a targeting scheme; and, more particularly, to an extended description structure for supporting a targeting scheme by using a Moving Picture Experts Group 21 (MPEG-21) Usage Environment Description (UED) tool in a Television Anytime (TV-Anytime), and a TV Anytime service providing system and method employing the description structure.

BACKGROUND ART

Targeting is an operation providing appropriate contents automatically according to usage environment, such as user preference for contents, performance of a terminal, and network characteristics. To execute targeting, a package schema describing usage environment conditions and the relationship between components should be defined. Also, the concept of a targeting service comprehends not only targeting of contents but also targeting of Electronic Program Guide (EPG) and/or advertisement. In connection with the targeting, the $27^{th}$ meeting for the International Standards for TV-Anytime in San Jose has produced WD942. The section 5 of the WD942 describes tools for supporting targeting, which is one of the major subjects of TV-Anytime Phase 2.

The tools described in the WD942 are a TargetingCondition element included in a descriptor of a PackageInformationTable and a Condition element included in an Item element of a package.

In the WD942, the TargetingCondition element is described by descriptive information a usage environment including "TargetingCondition can have user condition, terminal condition, network condition and natural environment condition like the Moving Picture Experts Group 21 (MPEG-21) Usage Environment Description (UED) as shown in FIG. 1(*b*) and FIG. 7." In other words, the current targeting condition has a structure of description tools of MPEG-21 Part 7, i.e., Digital Item Adaptation.

However, the current TargetingCondition element in the PackageInformationTable and the Condition element are not sufficient to support targeting as described in a Requirement document for standardization. To sum up, the current structure including the targeting information only on the package side can support only one aspect or group of an application scenario. Herein, the TV-Anytime (TVA) box extracts packages considered to be appropriate from the PackageInformationTable.

Meanwhile, the service provider can collect user profiles and transmit contents or a package to a particular target user. To support an application scenario that belongs to a recent application description, addition description on usage environment on the side of the TVA box should be added to TVAMain as the range of UserDescription.

In short, an extended description method is required to support a targeting scheme for the use of usage environment description tools as an extension of a UserDescription element supporting a targeting application with reference to the items of usage environment description tools.

DISCLOSURE

Technical Problem

It is, therefore, an object of the present invention to provide an extended description structure supporting a targeting scheme by using the Moving Picture Experts Group 21 (MPEG-21) Usage Environment Description (UED), and a TV-Anytime service providing method and system employing the same.

The other objects and advantages of the present invention can be understood by the following description and with reference to the embodiments of the present invention. Also, the objects and advantages of the present invention can be easily implemented by the means as claimed and combinations thereof.

Technical Solution

In accordance with one aspect of the present invention, there is provided a service providing method for providing a package including a component to a user terminal, comprising the steps of generating metadata including user information and usage environment information and transmitting the metadata to the user terminal.

In accordance with another aspect of the present invention, there is provided a service providing apparatus for providing a package including a component to a user terminal, comprising generating unit for generating metadata including user information and usage environment information and transmitting unit for transmitting the metadata to the user terminal.

In accordance with another aspect of the present invention, there is provided a consuming method for consuming a package including a component, comprising the steps of acquiring metadata including user information and usage environment information and selecting the package using the metadata.

In accordance with another aspect of the present invention, there is provided a user terminal for consuming a package including a component, comprising acquiring unit for acquiring metadata including user information and usage environment information and selecting unit for selecting the package using the metadata.

In accordance with another aspect of the present invention, there is provided a metadata for a package including a component, comprising user information and usage environment information.

DESCRIPTION OF DRAWINGS

The above and other objects and features of the present invention will become apparent from the following description of the preferred embodiments given in conjunction with the accompanying drawings, in which:

FIG. 5 shows a modified schema on a user information type (UserInfoType);

FIG. 6 presents a modified schema on a location type (LocationType);

FIG. 7 shows a modified schema on a time type (TimeType);

BEST MODE FOR THE INVENTION

Figure 1:
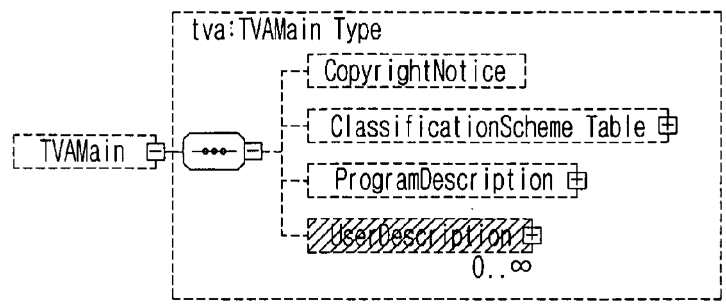
FIG. 1 is a diagram illustrating a TV-Anytime Main (TVA-Main) element having a UserDescription Type.

Other objects, features and advantages of the invention will become apparent from the following description of the embodiments with reference to the accompanying drawings, which is set forth hereinafter. Accordingly, the technological concepts of the present invention can be easily implemented by those of ordinary skill in the art to which the present invention belongs. Also, if further detailed description on the related prior arts is considered to blur the point of the present invention, the description is omitted. Hereafter, preferred embodiments of the present invention will be described in detail with reference to the drawings. The terms and words used in the present specification and claims should not be construed to be limited to the common or dictionary meaning, because an inventor defines the concept of the terms appropriately to describe his/her invention as best he/she can. Therefore, they should be construed as a meaning and concept fit to the technological concept and scope of the present invention.

In the claims of the present specification, an element expressed as a means for performing a function described in the detailed description is intended to include all methods for performing the function including all formats of software, such as combinations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

Targeting of contents is performed in two methods. The first one is to perform targeting by acquiring consumer profile on the side of a client, i.e., PDR/NDR, and the other one is to perform targeting by acquiring detailed contents description.

According to the first method, a service provider can access to consumer profile and select a consumer intended for targeted contents.

According to the second method, a service provider provides contents with detailed description, and a consumer extracts the contents to consume only targeted contents.

RQ001v2.0 Section 1 and Section 5.2, which provide general description on targeting, define and describe targeting as "a way to give consumer experience by automatically matching and delivering relevant contents to profiled consumers."

In this respect, targeting is not performed only by the information on the side of contents provider but carried out by information on both sides of a consumer and contents provider, such as an application scenario using UserDescription in the TVA Phase 1.

Hereafter, whether current metadata specification has information sufficient to support targeting and how far the range of description should be extended to include UserDescription will be described first. Then, an extended description for supporting a targeting scheme and a TV-Anytime service providing method and system will be described in accordance with the embodiments of the present invention.

FIG. 1 is a diagram illustrating a TV-Anytime Main (TVAMain) element having a UserDescription Type.

As shown in FIG. 1, the metadata specification of Phase 1 simply includes UserDescription element as an option element of the TVAMain element. The UserDescription element includes a user interaction tool of MPEG-7 Part 5: UserPreferences and UsageHistory.

Figure 2:
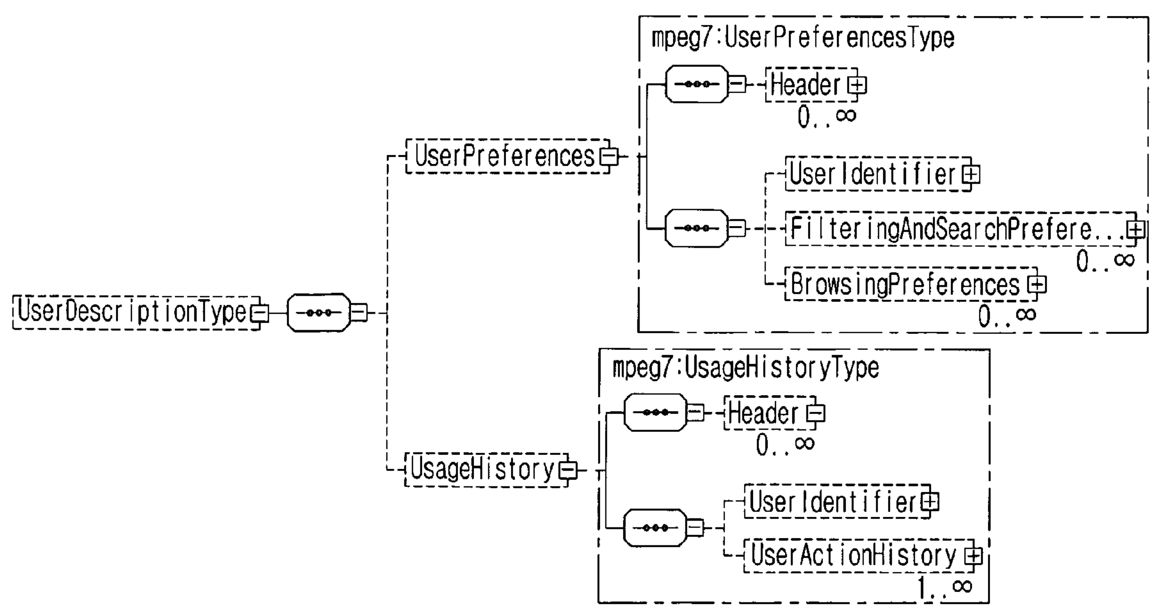
FIG. 2 is a diagram showing a structure of the UserDescription type of FIG. 1.

FIG. 2 is a diagram showing a structure of the UserDescription type of FIG. 1.

As illustrated in FIG. 2, the UserPreferences of the MPEG-7 provides the preferences of a consumer for contents based on contents description and preferences of a customer in the methods for browsing contents. Herein, although the MPEG-7 user preference tools can be used to provide the basic functions of targeting, the MPEG-7 user preference tools are not sufficient to support diverse possible scenario in the TV-Anytime targeting environment.

TV179r3 (CfC for TV-Anytime Phase 2 Technologies on Sharing, Synchronization, Packaging, Targeting and Interactivity) defines targeting as follows.

"Targeting is a way to give consumer experience by automatically matching and delivering relevant content according to profile. It includes personalized and localized contents services, which are adaptive to terminal, service environment, and user profile."

As defined in the CfC, it is obvious that the above described profile should include terminal, service environment and user profile to give a consumer experience.

Figure 3A:
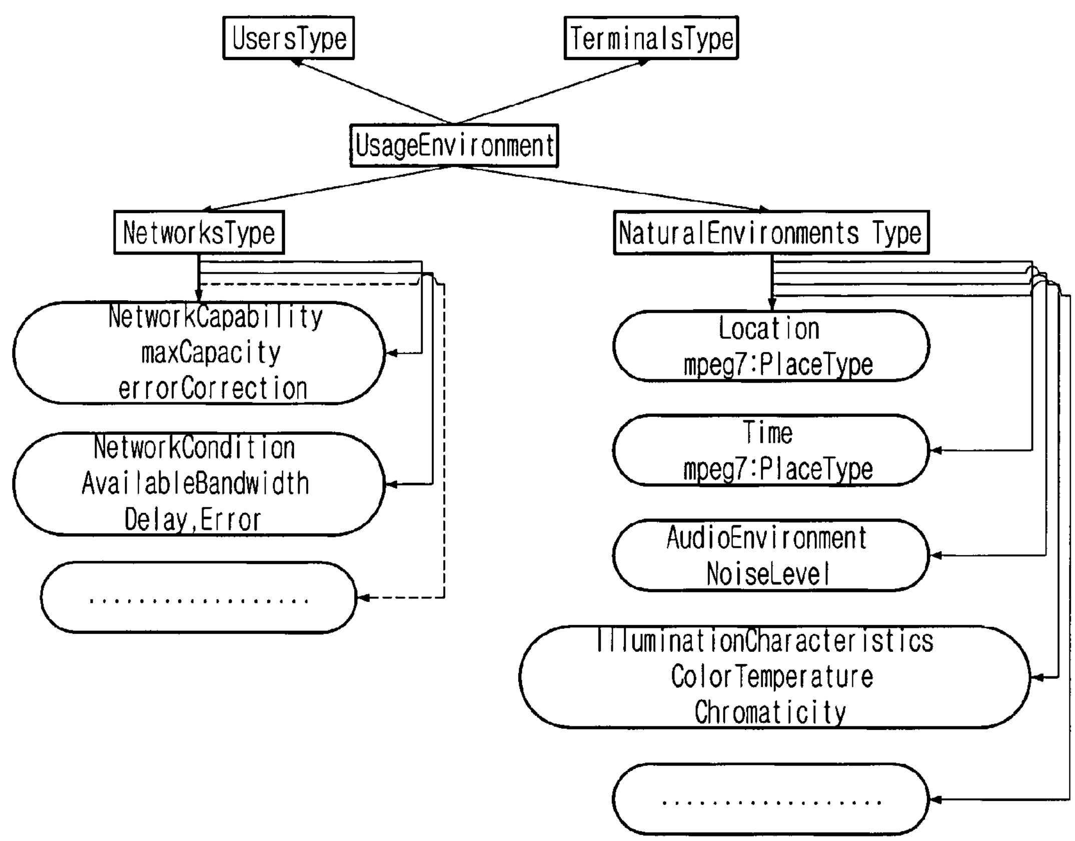
FIGS. 3A and 3B are diagrams depicting a Usage Environment Description (UED) tool of a Moving Picture Experts Group 21 (MPEG-21) Part 7.
Figure 3B:
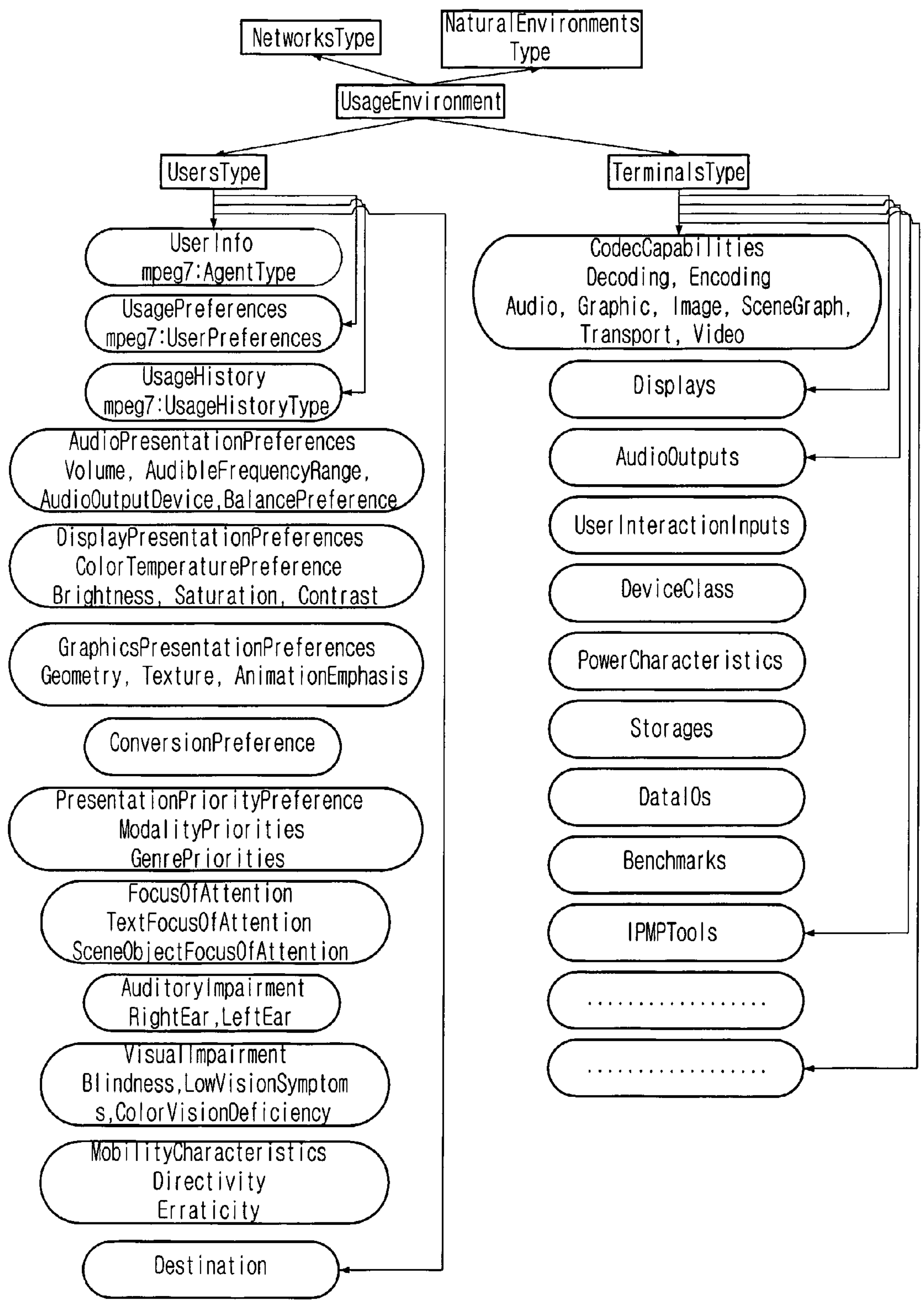

FIGS. 3A and 3B are diagrams depicting a Usage Environment Description (UED) tool of the MPEG-21 Part 7.

As shown in FIGS. 3A and 3B, the tool includes UserType, TerminalsType, NetworksType, and NaturalEnvironmentsType.

The UserType describes diverse user characteristics including general user information (bibliographical data), UsageType and UsageHistory, UsagePreferences, PresentationPreference, Accessibility characteristic, MobilityCharacteristics, and Destination.

The TerminalType should satisfy the consumption and operation limitations of a particular terminal. The TerminalType is defined by a wide range of diverse properties. For example, the TerminalType is defined by codec capability including encoding and decoding capabilities, device property including power source, storage and data input/output unit, and input/output characteristics including display and audio output capacity.

The NetworksType is specified by network capacity and conditions including available bandwidth and delay and error characteristics. The technologies can be used to transmit resources usefully and powerfully.

The NaturalEnvironmentsType specifies not only the characteristics of audio/visual aspects but also natural usage environment including location and the usage time of a digital item. For the visual aspect, IlluminationCharacteristics sensing display of visual information are specified and for the audio aspect, technologies on noise level and noise frequency spectrum are described.

Therefore, the MPEG-21 Part 7 UED is used to extend the UserDescription element of the TVAMain element and include information on terminal, service environment and user profile which are described in the TV179r3 in addition to the targeting conditions defined in the WD942.

Hereafter, the extended UserDescription using the MPEG-21 UED, which is suggested in the present invention, will be described.

In order to author diverse targeting scenarios easily, the basic usage environment description tools, i.e., core description tools, for targeting include user information (UserInfo), UsagePreferences and UsageHistory of the UserType description tools; CodecCapability, CodecParameter, DisplayCapability and AudioOutput of the TerminalsType description tools; NetworkCapability and NetworkCondition of the NetworksType description tools; and Location and Time of the NaturalEnvironmentsType description tools.

Other UED tools can be used as extended description tools extended for targeting of a specific purpose.

Table 1 below presents simple description on tools selected for core description tools.

TABLE 1

| Class | Tools | Description |
|---|---|---|
| User Characteristics | UserInfo | mpeg7:AgentType General characteristics of a user. Does not have age, sex. |
| | UsagePreference | Mpeg7:UserPreferencesType |
| | UsageHistory | Mpeg7:UsageHistoryType |
| Terminal Capability | CodecCapability | Place holder for description of codec capabilities in terms of codec parameters |
| | CodecParameter | Various parameters to describe codec capabilities such as buffersize, bitrate, memorybandwidth. |
| | DisplayCapability | Describes capability of a display including modes, resolutions, refreshrate, screen size, color depth, etc. |
| | AudioOutput | Describes capabilities of the audio output device including frequency range, RMS power, supported number of channels, sampling frequency, etc. |
| Network Characteristics | NetworkCapability | Describes static network capabilities including max bandwidth, min bandwidth, in-sequence delivery, error correction capability, etc. |
| | NetworkCondition | Describes dynamic network capabilities including available bandwidth, delay characteristics, delay variation, bit error rate, etc. |
| Natural Environment Characteristics | Location | Mpeg7:PlaceType. Location of the usage of the content. |
| | Time | Mpeg7:TimeTye. Time of the usage of the content. |

Referring to Table 1, it can be seen that the UserInfo and UsageEnvironmentDescription of the UserType description tools are included to extend targeting in the present invention. Herein, the UserInfo is information on a user other than user preferences and usage history. For example, the UserInfo includes AgentType and general characteristics of the user.

Also, according to the present invention, it is possible to provide a service reflecting the usage environment on the side of the user using the TV-Anytime providing service by adding usage environment description which is selected in the MPEG-21 UED tools.

Figure 4:
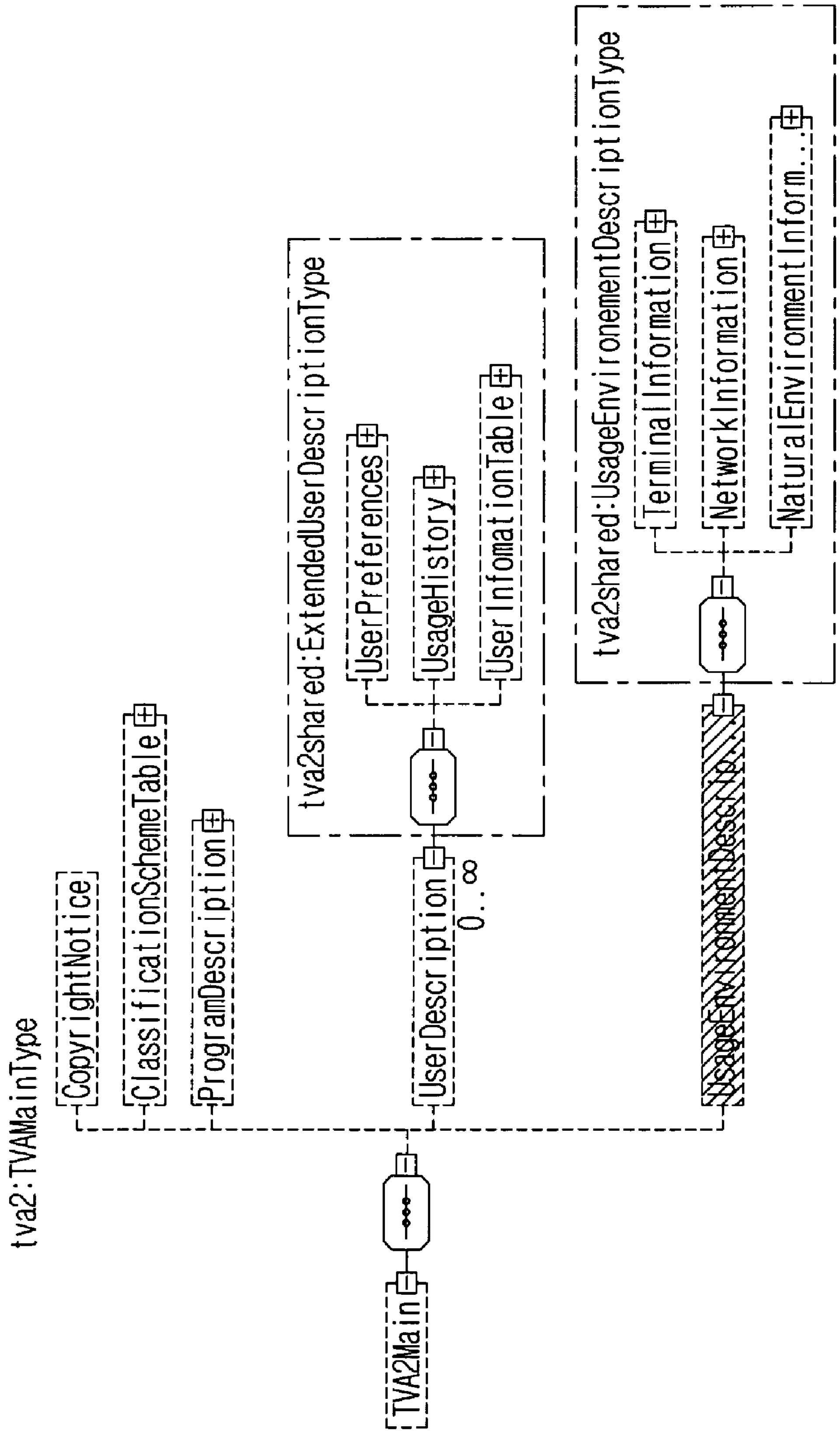
FIG. 4 is a diagram describing an example of package metadata based on extended description for a targeting scheme suggested in the present invention.

FIG. 4 is a diagram describing an example of package metadata based on extended description for a targeting scheme suggested in the present invention.

An important point that should be considered when the MPEG-21 UED tools are selected is a matter of UserInfo protection. The UsagePreferences and UsageHistory description tools selected in the MPEG-7 Part 5 has two attributes for the purpose of UserInfo protection.

One of the two attributes is allowAutomaticUpdate attribute indicating whether automatic update of the personal data of a user is allowed, and the other is protection attributes not allowing the service provider to search personal data but desiring to keep the personal data secret.

However, the MPEG-21 USE tools do not have personal data protection mechanism. Therefore, when the MPEG-21 USE tools are selected for targeting, a personal data protection mechanism should be used.

Although not all the UED tools need to be protected, there are descriptions in need of basic protection.

In other words, the UserInfo including the name of the user and subscription data should be protected. Also, the region and time of the user can be the user information that should be protected. The TerminalCapability and NetworkCharcteristics can be considered as the UserInfo as well. However, the description on the TerminalCapability and NetworkCharcteristics can be protected just as user information is protected according to necessity.

One method for protecting the UserInfo, Location and Time is to include protected attributes in each description based on UsagePreferences and UsageHistory.

Since the UserInfo is not automatically updated, the present invention does not include an allowAutomaticUpdate attribute into the UserInfo.

However, since the Location and Time can be automatically updated, the allowAutomaticUpdate attribute should be included.

FIGS. 5 to 7 present modified schemas on the UserInfo, Location, and Time.

FIG. 5 shows a modified schema on UserInfoType and FIG. 6 shows a modified schema on LocationType, while FIG. 7 shows a modified schema on TimeType.

As shown in FIGS. 5 to 7, the modified parts of the schemas are underlined. In short, the underlined parts of FIGS. 5 to 7 are user information protection metadata, location information protection metadata, time information metadata.

In addition to TargetCondition defined in the WD942, the UED tools adopted in the present invention automatically match contents with user profile and provide the contents, which is defined in requirements document for standardization. Therefore, in the present invention, UserDescription of the Phase 1 metadata needs to be located in the top level of the TVAMain to provide the targeting function that gives a consumer experience.

Figure 8:
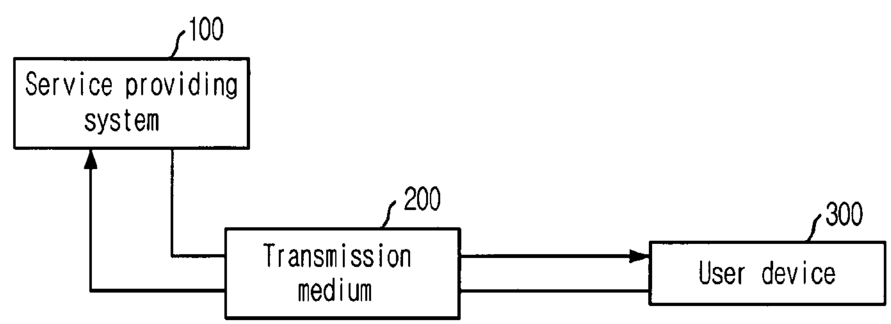
FIG. 8 is a block diagram describing a TV-Anytime service providing system in accordance with an embodiment of the present invention.

FIG. 8 is a block diagram describing a TV-Anytime service providing system in accordance with an embodiment of the present invention.

Referring to FIG. 8, the TV-Anytime service providing system is composed of a service providing system 100 for providing various contents and package metadata, and a user device 300 for consuming the various contents provided by the service providing system 100. The contents and the package metadata are provided to the user device 300 through a transmission medium 200. As for the transmission medium 200, a broadcasting network and the Internet for providing a TV-Anytime service, a mobile communication network, and a wideband Local Area Network (WLAN) can be used. Also, a television (TV), a personal computer (PC), a mobile phone, a Personal Digital Assistant (PDA) or a Digital Multimedia Broadcasting (DMB) terminal that accesses to the transmission media 200 can be the user device 300.

Also, the service providing system 100 can be referred to as a 'TV-Anytime Main side,' and the user device can be referred to as a 'TV-Anytime Box side' or a client (PDR/NDR) side.

The present invention can have diverse embodiments within a range that the embodiments do not get out of the technological concept of the present invention, and the service providing system 100 can be realized to include a user description means including user information; a usage environment description means including usage environment information; and a package metadata generation means for generating package metadata by using the user description means and the usage environment description means. The user device 300 includes a package metadata acquiring means, a usage environment description determining means for determining usage environment description in the acquired package metadata, and a content selecting means for selecting contents suitable for the usage environment.

Figure 9:
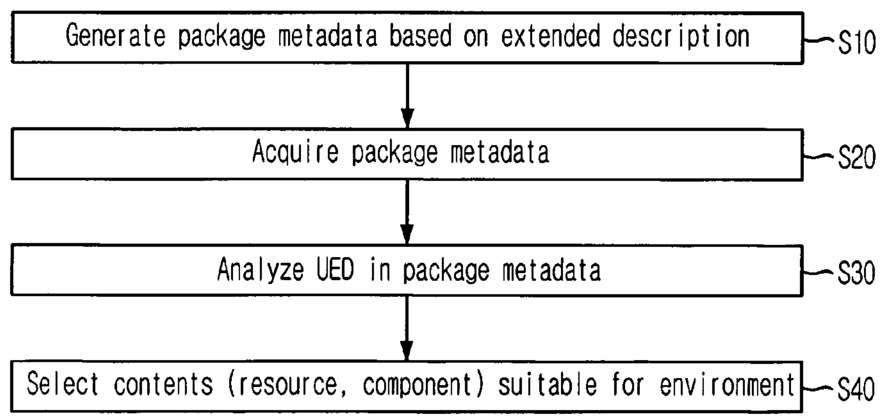
FIG. 9 is a flowchart illustrating a TV-Anytime service providing method in accordance with an embodiment of the present invention.

FIG. 9 is a flowchart illustrating a TV-Anytime service providing method in accordance with an embodiment of the present invention.

Referring to FIGS. 8 and 9, the service providing system 100 generates package metadata based on the extended description in step S10. Herein, the package metadata based on the extended description includes extended user description, usage environment description and data for information protection. Subsequently, the user device 300 acquires package metadata in step S20 to attain a desired package. After the acquisition of the package metadata, in step S30, the user device 300 determines the UED within the package metadata. Then, the user device 300 selects contents, which includes resources and components, suitable for the usage environment according to the determination of the usage environment description and consumes the contents.

As described above, since the extended user description includes user information and usage environment information, the TV-Anytime service providing system and method of the present invention can support the targeting function efficiently.

Since the present invention described above utilizes the MPEG-21 UED tools to extend user description (UserDescription), it is possible to add a new function to targeting while maintaining the metadata schema of Phase 1.

Also, the present invention provides a means for profiling the UED tools in core description and provides the targeting and the service based on the extended description by simply modifying the basic personal data protection mechanism.

While the present invention has been described with respect to certain preferred embodiments, it will be apparent to those skilled in the art that various changes and modifications may be made without departing from the scope of the invention as defined in the following claims.

What is claimed is:

1. A service providing method for providing a package including a component to a user terminal, the method comprising:

generating metadata including user information and usage environment information as an extended description of a Moving Picture Experts Group 21 (MPEG-21) Usage Environment Description (UED);

transmitting the metadata to the user terminal, wherein the usage environment information includes location information and time information, wherein the location information and the time information include auto-update attributes;

wherein the metadata further includes usage preference and usage history; and wherein the location information, the time information and user information include protection attributes based on the usage preference or the usage history.

2. The method as recited in claim 1, wherein the user information includes agent type, accessibility information, or user's biographic information.

3. A service providing apparatus for providing a package including a component to a user terminal, the apparatus comprising:

a generating unit for generating metadata including user information and usage environment information as an extended description of a Moving Picture Experts Group 21 (MPEG-21) Usage Environment Description (UED);

a transmitting unit for transmitting the metadata to the user terminal, wherein the usage environment information includes location information and time information, wherein the location information and the time information include auto-update attributes, wherein the metadata further includes usage preference and usage history, and wherein the location information, the time information and user information include protection attributes based on the usage preference or the usage history.

4. The apparatus as recited in claim 3, wherein the user information includes agent type, accessibility information, or user's biographic information.

5. A consuming method of a user terminal for consuming a package including a component, the method comprising:

obtaining metadata including user information and usage environment information generated as an extended description of a Moving Picture Experts Group 21 (MPEG-21) usage Environment Description (UED);

selecting the package using the metadata, wherein the usage environment information includes location information and time information, wherein the location information and the time information include auto-update attributes, wherein the metadata further includes usage preference and usage history, and wherein the location information, the time information and user information include protection attributes based on the usage preference or the usage history.

6. The method as recited in claim 5, wherein the user information includes agent type, accessibility information, or user's biographic information.

7. A user terminal for consuming a package including a component, the user terminal comprising:

an obtaining unit for acquiring metadata including user information and usage environment information generated as an extended description of a Moving Picture Experts Group 21 (MPEG-21) Usage Environment Description (UED);

a selecting unit for selecting the package using the metadata, wherein the usage environment information includes location information and time information, wherein the location information and the time information include auto-update attributes, wherein the metadata further includes usage preference and usage history, and wherein the location information, the time information and user information include protection attributes based on the usage preference or the usage history.

8. The user terminal as recited in claim 7, wherein the user information includes agent type, accessibility information, or user's biographic information.

9. A non-transitory computer-readable medium containing metadata for targeting of a package including a component, the metadata comprising:

user information and usage environment information generated as an extended description of a Moving Picture Experts Group 21 (MPEG-21) Usage Environment Description (UED), wherein the usage environment information includes location information and time information, wherein the location information and the time information include auto-update attributes, wherein the metadata further includes usage preference and usage history, and wherein the location information, the time information and user information include protection attributes based on the usage preference or the usage history.

10. The metadata as recited in claim 9, wherein the user information includes agent type, accessibility information, or user's biographic information.

* * * * *